US005858533A

United States Patent [19]

Greuter et al.

[11] Patent Number: 5,858,533

[45] Date of Patent: Jan. 12, 1999

[54] COMPOSITE MATERIAL

[75] Inventors: Felix Greuter; Ralf Strümpler, both of Baden, Switzerland

[73] Assignee: ABB Research Ltd., Zurich, Switzerland

[21] Appl. No.: 782,264

[22] Filed: Jan. 15, 1997

Related U.S. Application Data

[63] Continuation of Ser. No. 312,637, Sep. 27, 1994, abandoned.

[30] Foreign Application Priority Data

Oct. 15, 1993 [CH] Switzerland ........................... 3124/93

[51] Int. Cl.[6] ........................... B32B 27/00; H01C 7/02; H01C 7/10; H01C 7/12

[52] U.S. Cl. ........................ 428/404; 428/325; 428/328; 428/331; 428/402; 428/901; 428/913; 338/7; 338/14; 338/20; 338/21; 338/22 R; 338/223; 338/224; 327/512

[58] Field of Search .................................. 428/901, 913, 428/323, 325, 328, 402, 403, 404, 931, 331; 338/14, 20, 21, 22 R, 223, 224; 324/341; 327/509, 516, 512; 29/25.01, 25.02, 25.03, 25.35; 252/521, 520

[56] References Cited

U.S. PATENT DOCUMENTS

| | | | |
|---|---|---|---|
| 3,764,529 | 10/1973 | Matsuo et al. | 252/1 |
| 3,795,048 | 3/1974 | Tachibana et al. | 29/621 |
| 3,805,022 | 4/1974 | Kulwicki et al. | 219/505 |
| 4,152,743 | 5/1979 | Comstock | 361/56 |
| 4,271,446 | 6/1981 | Comstock | 361/56 |
| 4,347,539 | 8/1982 | Peterson et al. | 361/16 |
| 4,475,091 | 10/1984 | Itakura et al. | 333/17 L |
| 4,534,889 | 8/1985 | van Konynenburg et al. | 252/511 |
| 4,583,146 | 4/1986 | Howell | 261/13 |
| 4,636,378 | 1/1987 | Pastor et al. | 423/598 |
| 4,726,991 | 2/1988 | Hyatt et al. | 428/329 |
| 4,780,598 | 10/1988 | Fahey et al. | 219/511 |
| 5,008,646 | 4/1991 | Hennings et al. | 338/20 |
| 5,064,997 | 11/1991 | Fang et al. | 219/505 |
| 5,128,581 | 7/1992 | Nakayama et al. | 310/329 |
| 5,294,374 | 3/1994 | Martinez et al. | 252/518 |
| 5,313,184 | 5/1994 | Greuter et al. | 338/21 |

FOREIGN PATENT DOCUMENTS 0 548 606 A2 6/1993 European Pat. Off. .

OTHER PUBLICATIONS

*Composite PTCR thermistors utilizing conducting borides, silicides, and carbide powders,* Journal of Materials Science, vol. 26, pp. 145–154, 1991.

*New, Z–direction anisotropically conductive composites,* J. Appl. Phys. 64 (10), S. Jin, R.C. Sherwood, J.J. Mottine, T.H. Tiefel and R.L. Opila, pp. 6008–6010, 1988.

*Primary Examiner*—Vivian Chen
*Attorney, Agent, or Firm*—Burns, Doane, Swecker & Mathis, L.L.P.

[57] ABSTRACT

A varistor and a PTC resistor formed from a composite material containing a polymer matrix and a filler. The varistor experiences two nonlinear changes caused by the current due to applied voltage, the varistor comprising a composite material comprising a filler and a polymer matrix, the filler consisting of particles of grained microstructure. The PTC resistor experiences a first nonlinear dependency of resistivity at a first PTC temperature resulting from an interaction of the filler and the polymer matrix and a second nonlinear dependency of resistivity at a second, lower PTC temperature resulting from the filler.

11 Claims, 5 Drawing Sheets

COMPOSITE MATERIAL

This application is a continuation of Ser. No. 08/312,637, filed Sep. 27, 1994, abandoned.

BACKGROUND OF THE INVENTION

1. Field of the Invention

The invention proceeds from a composite material comprising a filler and a matrix which embeds the filler, in which material at least one physical quantity causes at least two nonlinear changes in a material property or at least one nonlinear change in each case in one of at least two material properties as a result of acting on the filler and/or the matrix.

2. Discussion of Background

EP 0 548 606 A2 discloses an electrical resistor. Said resistor contains a resistor body composed of a composite material containing a polymer as matrix. Embedded in the polymeric matrix as fillers are an electrically conductive powder, for instance soot, and a powdered varistor material, for instance based on a sprayed granular material. In this resistor, the electrically conductive powder forms current paths passing through the resistor body during normal operation. Above a certain value of the current, the resistor body heats up intensely. The polymer matrix expands considerably and thus separates the particles of the electrically conductive filler which form the current path. The current is interrupted. If the voltage across the resistor body or locally in the resistor body increases too strongly under these circumstances, the particles of the varistor material form percolating paths, which dissipate the undesirably high voltage, locally or throughout the entire resistor body above a specified limit value of the voltage. However, two different fillers are needed for the abovedescribed functions of current interruption and of voltage limitation, which functions are caused by a nonlinear behavior of the composite material with respect to the current carried or to the applied voltage. For some applications this is undesirable and may possibly result in difficulties in the production of the composite material.

SUMMARY OF THE INVENTION

Accordingly, one object of the invention is to provide a novel composite material of the type mentioned at the outset which can easily be produced and can readily be matched to a specified requirement profile by suitable selection of the filler and of the matrix with respect to its material properties.

The composite material according to the invention is one which can readily be adapted to a requirement profile by suitable selection of filler and matrix and which comprises at least two material properties having nonlinear behavior.

The filler and/or the matrix may react to an external physical quantity by means of a structural change, for example a phase change from solid to liquid, which causes a nonlinear change in a material property, for example in the electrical conductivity. However, a nonlinear change in a material property may also be caused by the action of external physical quantity, for example of an electrical field, without structural change.

Hereinafter, a matrix is described as active if it undergoes a structural change when acted on by one or more physical quantities, which structural change results in a nonlinear change in a material property of the composite material. A matrix is described as passive if it does not undergo any structural change when acted on by one or more physical quantities and, consequently, does not cause any nonlinear change in a material property of the composite material.

In general a polymer, for example a thermoplastic and/or thermoset and/or an elastomer, is provided as matrix. Optionally, however, an inorganic material, for example glass, ceramic, based for instance on $ZrO_2$, quartz, geopolymer and/or metal may be provided as matrix. The matrix is predominantly made up of solids, but it can optionally also be liquid. The matrix may be passive, but in general it is selected so that it reacts actively to temperature changes (polyethylene), pressure (elastomers or thermoplastics filled with deformable particles, such as hollow spheres), or electrical fields (piezoelectric polymers such as polyvinylidene fluoride) with structural changes.

The filler should contain particles of core-and-shell structure or of grained microstructure having mean particle sizes of typically up to a few 100 $\mu$m. If the filler contains a component comprising particles of grained microstructure, the composite material should not, however, contain any filler component comprising electrically conductive particles whose electrical conductivity is higher than the electrical conductivity of the particles of grained microstructure when acted on by an electric field which results in a nonlinear change in the electrical conductivity of the composite material.

The shells of the particles of core-and-shell structure are advantageously of insulating material, but the cores of said particles are preferably composed of electrically conducting and/or electrically semiconducting material.

If the shells of said particles are composed of a chalcogenide such as, in particular, an oxide or sulfide, a nitride, phosphide and/or sulfate, they should be dimensioned in such a way that, at a specified value of an electrical field acting in the composite material, the electrical conductivity of the composite material changes nonlinearly. If the particles are then situated in a passive matrix formed by a thermoplastic or thermosetting polymer, the electrical conductivity of said composite material can change nonlinearly twice when acted on by an electrical field if the material of the cores is suitably selected. The first of said nonlinear changes produces a voltage limitation and the second produces a current or power or energy limitation. If, on the other hand, the particles are situated in an active matrix formed by a thermoplastic or thermosetting or elastomeric polymer, yet a third nonlinear change in the conductivity of the composite material can then additionally be achieved, which change serves as additional self-protection for the composite material against excessively high current consumption and, consequently, against overheating. Advantageously, the cores may contain doped $V_2O_3$ or doped $BaTiO_3$ and the insulating shells $VO_2$, $V_2O_5$, $TiO_2$, BaO, BaS or $BaSO_4$. The abovementioned advantageous effects can also be achieved with cores composed of doped or undoped semiconducting material such as, in particular, ZnO, SiC, Si, $TiO_2$ or $SnO_2$.

If cores of the particles contain electrically conducting material such as, in particular, TiC, $TiB_2$, BaTi, SrTi, $V_2O_3$, Al, Cu, Sn, Ti or Zn and if the shells of the particles are formed by a material having high permittivity which depends nonlinearly on an external physical quantity, preferably a ferroelectric or an antiferroelectric, a composite material is present which can be used as dielectric.

If the matrix is formed by an elastomeric and therefore pressure-responsive polymer in the case of such a filler and if the shells contain a bismuthate such as, in particular, $BaW_{1/3}Bi_{2/3}O_3$, a niobate such as, in particular, $PbFe_{0.5}Nb_{0.5}O_3$, a scandate such as, in particular, $PbW_{1/3}Sc_{2/3}O_3$, a stannate such as, in particular, $SrSnO_3$, a tantalate such as, in particular, $PbFe_{0.5}Ta_{0.5}O_3$, a titanate such as, in particular, $BaTiO_3$ or $SrTiO_3$, a zirconate such as, in particular, $PbZrO_3$, a manganite such as, in particular, $PbW_{1/3}\ Mn_{2/3}O_3$, a rhenite such as, in particular, $BaMn_{0.5}Re_{0.5}O_3$, a tellurite such as, in particular, $BaMn_{0.5}Te_{0.5}O_3$, a tungsten(VI) oxide such as, in particular, $PbMg_{0.5}W_{0.5}O_3$ or a gallium(VI) oxide such as, in particular, $PbW_{1/3}Ga_{2/3}O_3$, separately or as a mixture, two nonlinear changes in the permittivity and, consequently, also in the loss factor are achieved in the event of pressure and temperature changes with such a composite material. These two changes favor the use of such a composite material as dielectric in a pressure- and temperature-dependent capacitor.

If the matrix is formed, on the other hand, by a piezoelectric polymer, in particular polyvinylidene fluoride, with such a filler and if the shells contain bismuthate, niobate, scandate, stannate, tantalate, titanate, zirconate, manganite, rhenite, tellurite, tungsten(VI) oxide or gallium(VI) oxide, separately or as a mixture, two nonlinear changes in the permittivities are caused in such a composite material in the event of changes in the electrical field strength and the temperature. This composite material can therefore be used as dielectric in a voltage- and temperature-dependent capacitor. Similar remarks also apply to a composite material containing a similar filler but having a matrix formed by an active thermoplastic or thermosetting polymer.

If the composite material contains a filler in which both the cores and the shells of the particles of a core-and-shell structure are formed from electrically conducting material and the cores and/or the shells undergo a structural change when acted on by temperature, such a composite material can be used as PTC resistor. In such a composite material, it is preferable to provide cores composed of $V_2O_3$ and/or $BaTiO_3$, each in doped form, and shells composed of material with good electrical conductance, such as $TiB_2$ or TiC. At the same time, the shells should have a thickness such that the electrical conductivity of the cores which is reduced in the event of a structural change brings about an increase in the electrical resistance of the composite material, for example a doubling. As a result, on reaching a limit temperature, a reduction of a current conducted through the PTC resistor, for example a halving, can be achieved very rapidly. If, additionally, an active matrix, for example a thermoplastic or a thermosetting polymer, is provided, the already reduced current is then further limited by the more slowly heated polymer.

The particles of grained microstructure provided in the filler alternatively or, optionally, together with the particles of core-and-shell structure are formed either by comminuting a sintered ceramic or a polycrystalline semiconductor, or by spray-drying a suspension or solution and calcining or sintering the spray-dried particles. These particles may be ferroelectric or antiferroelectric and are, in particular, bismuthate, niobate, scandate, stannate, tantalate, titanate, zirconate, manganite, rhenite, tellurite, tungsten(VI) oxide or gallium(VI) oxide, separately or as a mixture, both doped and undoped. The particles may also be composed of doped metal oxide or metal carbide, such as SiC, $TiO_2$ or ZnO, and/or of $BaTiO_3$, $SrTiO_3$, InSb, GaAs or Si. Such composite materials exhibit two nonlinear, oppositely directed changes in the electrical conductivity in the event of temperature changes and can be used as combined NTC and PTC resistance element. If the particles having grained structure are embedded in an active matrix, two nonlinear changes occur in the electrical conductivity, one of which has voltage-limiting action and the other current-limiting or power-limiting or energy-limiting action.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In a first embodiment of the composite material according to the invention, a granular material having particle diameters between 3 and 300 $\mu$m was initially produced (as is known from varistor production) by spray drying from a suspension or a solution of zinc oxide and dopants based on a plurality of elements such as Bi, Sb, Mn, Co, Al, . . . . The granular material was sintered to form a powder at temperatures of approximately 1200° C. The powder particles are essentially of spherical structure and are composed in each case of a multiplicity of grains which adjoin one another in the fashion of the cover sections of a football cover. Each of the grains of a powder particle is composed of ZnO which is doped in a known manner with Bi, Sb, Mn, and/or further elements and conducts electrical current well. Between mutually adjacent grains are electrically insulating grain boundaries which become electrically conducting when a voltage of about 3 volts is applied. Depending on the choice of dopants and the nature of the production process, powder particles can be produced in this way which are electrically conducting when voltages of between 3 and 200 volts are applied and are electrically nonconducting below said voltage. The powder particles therefore have nonlinear behavior with respect to an external electrical field, determined primarily by the grain boundaries. Instead of a spherical shape, the powder particles may also have a needle or plate shape and, depending on production conditions, may be of compact or hollow construction.

25, 30, 35, 40 and 45 parts of the abovementioned powder were thoroughly mixed in each case with polyethylene and composite materials having a polyethylene matrix and having filler components of 25, 30, 35, 40 and 45 percent by volume were produced by hot press moulding.

Figure 1:
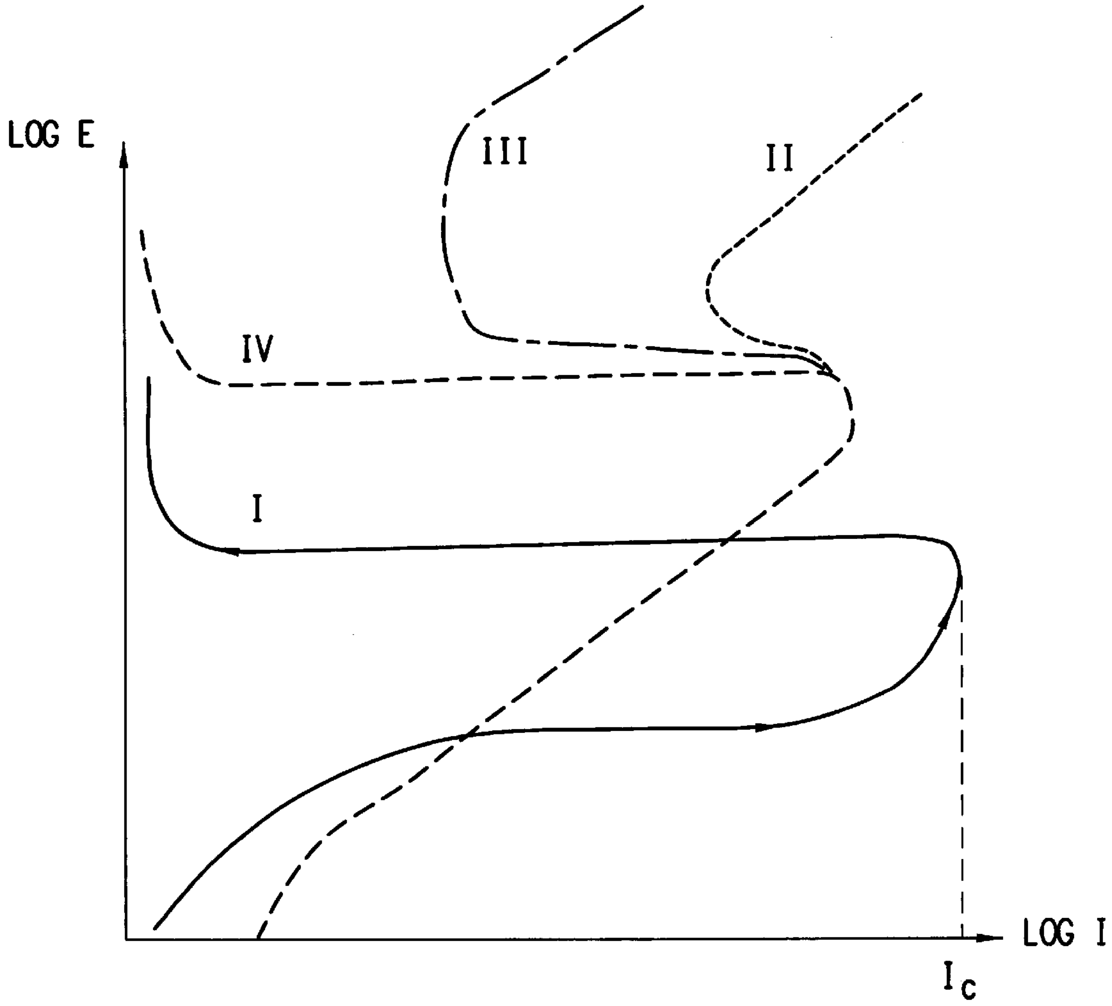
FIG. 1 shows the current/voltage characteristic curves of four varistors in which composite materials formed in accordance with four exemplary embodiments of the invention are provided as resistor body.

A varistor containing 25 percent by volume of doped ZnO has the current/voltage characteristic curve I shown in FIG. 1. Below a critical current level $I_C$, the varistor behaves essentially as a conventional varistor based on a sintered ceramic and has a severely nonlinear dependence of the current I it carries on the applied voltage E. Under these circumstances, the current is carried in percolating paths formed by powder particles. Above the critical current level $I_c$, the polymer matrix is heated to temperatures higher than the melting point of the polyethylene. The polymer matrix expands and interrupts the current-carrying paths. The varistor now returns to a high-resistance state and blocks the current. Activating the matrix above the critical current level $I_c$ therefore achieves the result that an unacceptable heating of the varistor is avoided.

Figure 2:
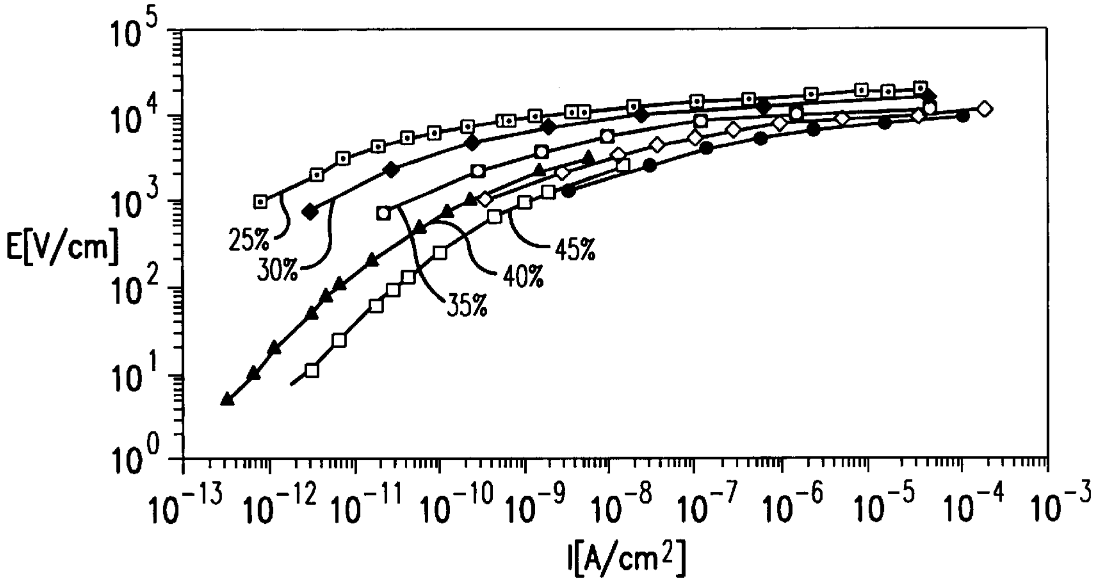
FIG. 2 shows a partial section of the current/voltage characteristic curve of a first of the four varistors shown in FIG. 1 and partial sections of the current/voltage characteristic curves of further varistors which differ from the first varistor only in the level of the filler component.

It can be seen from FIG. 2 that, with increasing filler component ff [percent by volume], the nonlinear behavior of the varistor is improved. Sufficiently good nonlinear behavior with respect to the external voltage E is achieved with filler components of approximately 30 to 50 percent by volume. In the case of these filler components, an overheating of the varistor is also reliably avoided by activating the polymer matrix.

Figure 3:
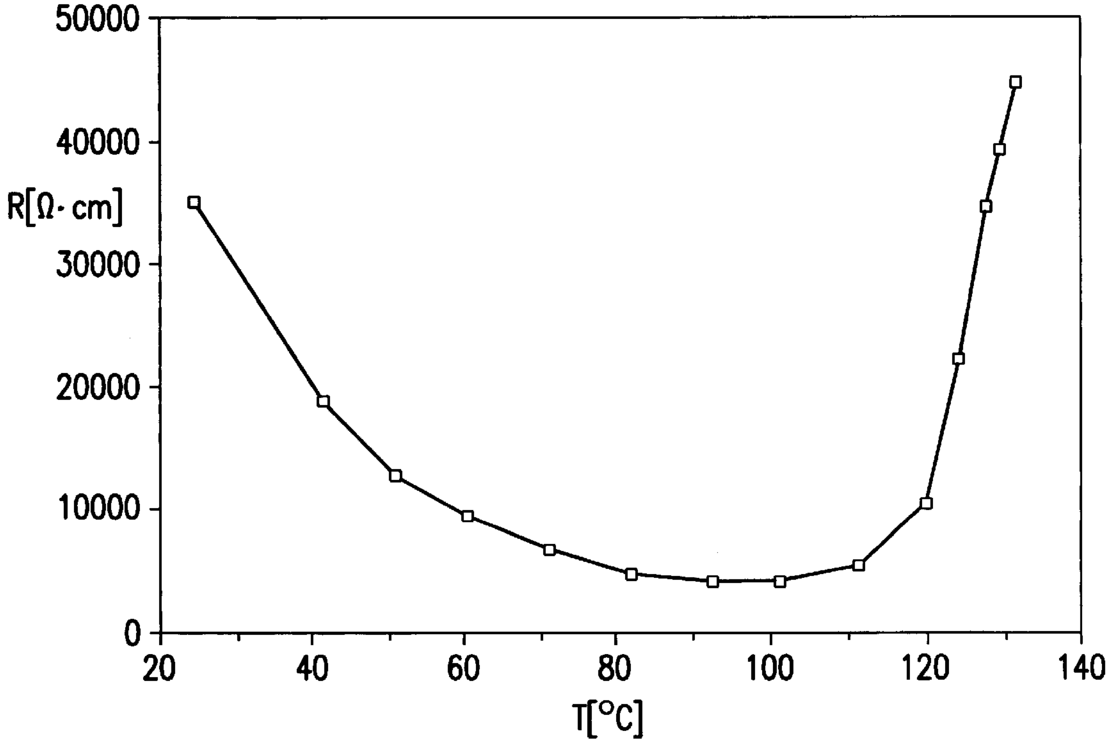
FIG. 3 shows a temperature/resistance characteristic curve of the first varistor.

From FIG. 3 it can be seen that a varistor comprising the composite material described above can also be used as NTC or PTC element. Specifically, the resistivity R of the composite material decreases nonlinearly on heating at temperatures T between 20° and 80° C. in order to increase again nonlinearly at temperatures between 110° and 130° C. In this case, the first resistance change is caused by the semiconducting zinc oxide of the filler and the second resistance change by the polymer matrix which is active at approximately 110° to 130° C.

Figure 4:
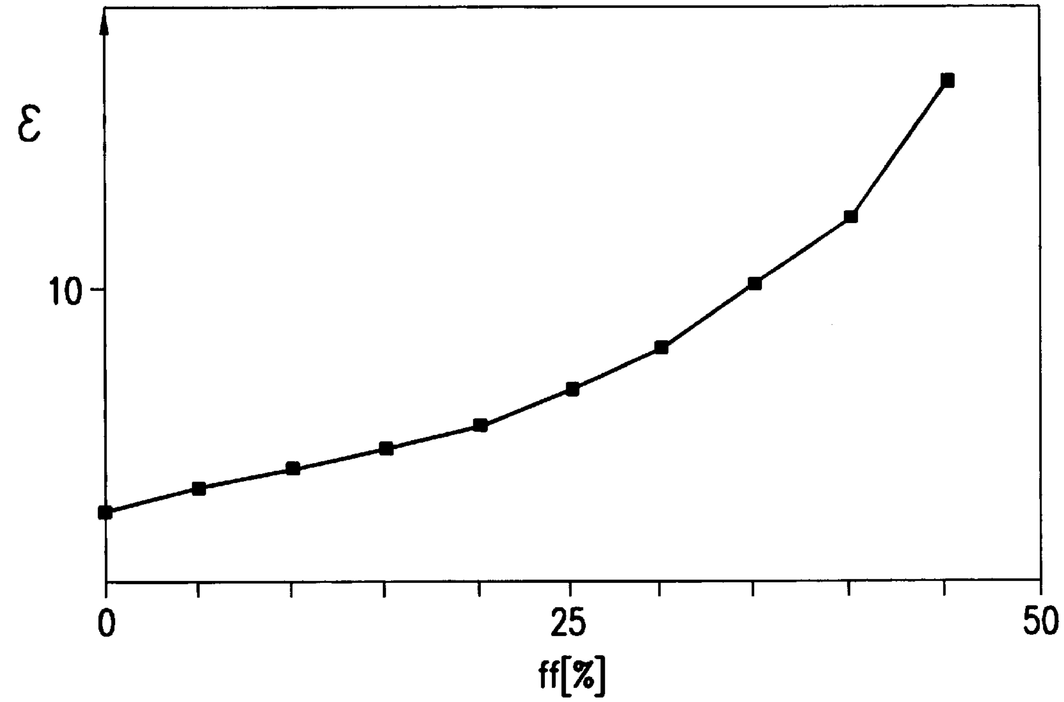
FIG. 4 shows a diagram in which the permittivity of the composite material of the first varistor is shown as a function of the filler component of the composite material.
Figure 5:
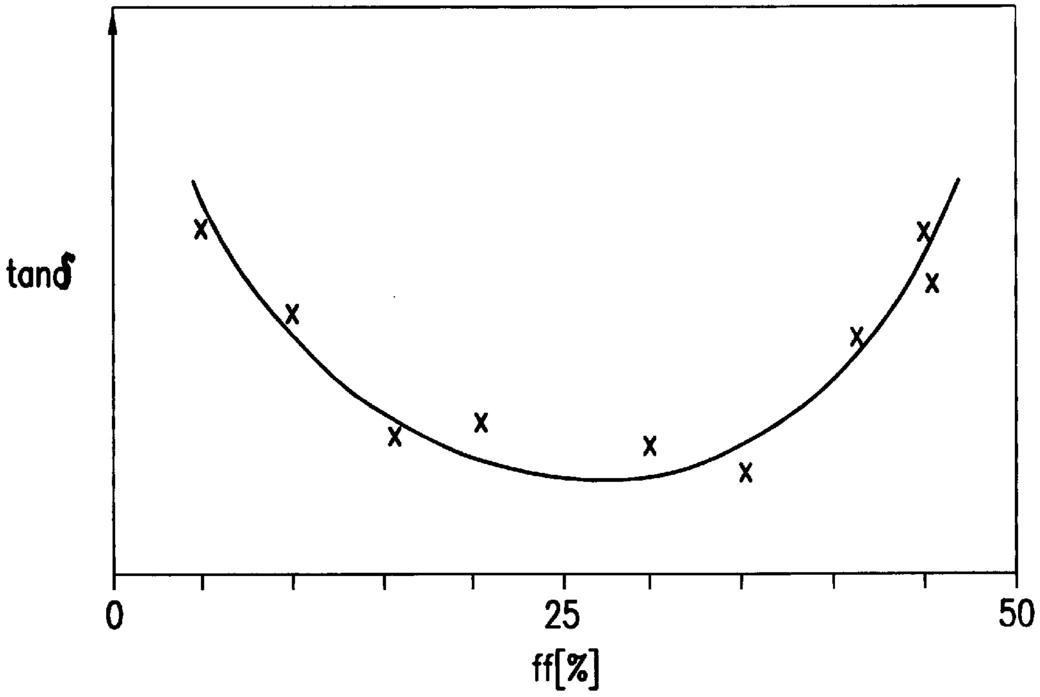
FIG. 5 shows a diagram in which the loss factor of the composite material of the first varistor is shown as a function of the filler component of the composite material.
Figure 6:
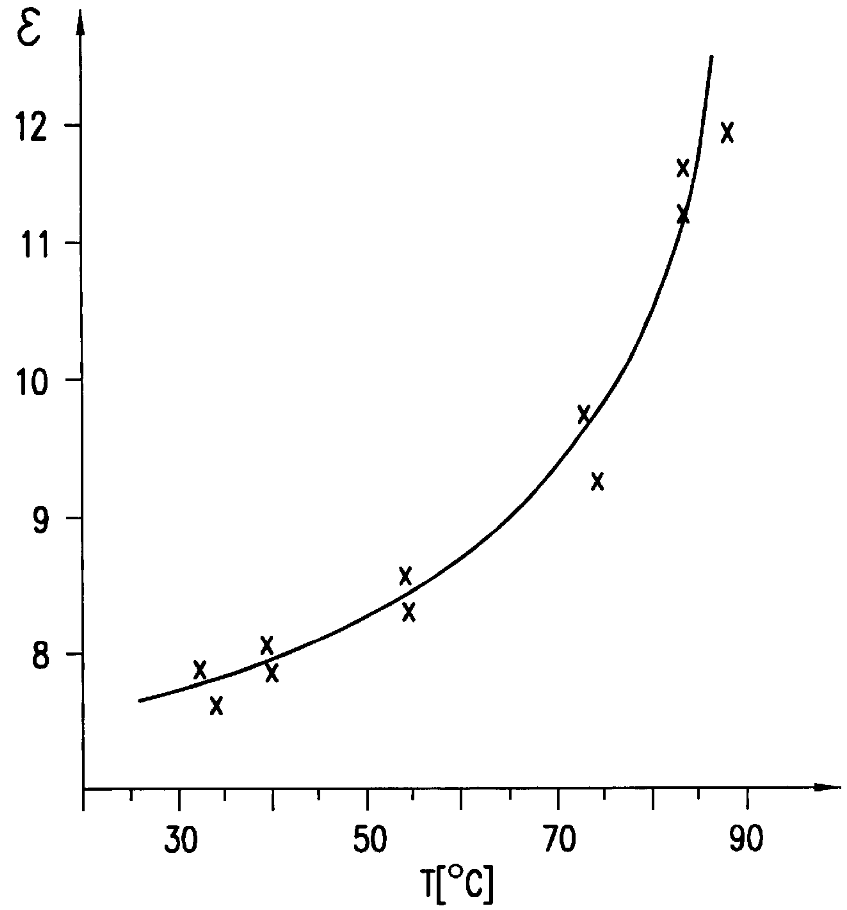
FIG. 6 shows a diagram in which the permittivity of a capacitor is shown as a function of temperature, the dielectric of the capacitor being formed by the composite material provided in the first varistor.

Because of the capacitive action which is produced by the grain boundaries of the individual powder particles (space charges), the composite material provided in the varistor can also be used as dielectric of a capacitor. The magnitudes of the permittivities and of the loss factor tan $\delta$ of the composite material are shown in FIGS. 4 and 5 as a function of the filler component ff [percent by volume]. From these figures it can be inferred that, with filler components of between 25 and 50 percent by volume, sufficiently good dielectric properties are achieved for many capacitor applications. In the event of increase in temperature, the permittivity and the loss factor are increased nonlinearly. This can be seen from FIG. 6 on the basis of the temperature variation of the permittivity $\epsilon$ of a composite material having a filler component of 25 percent by volume. Similar remarks apply to the loss factor of this composite material.

Figure 7:
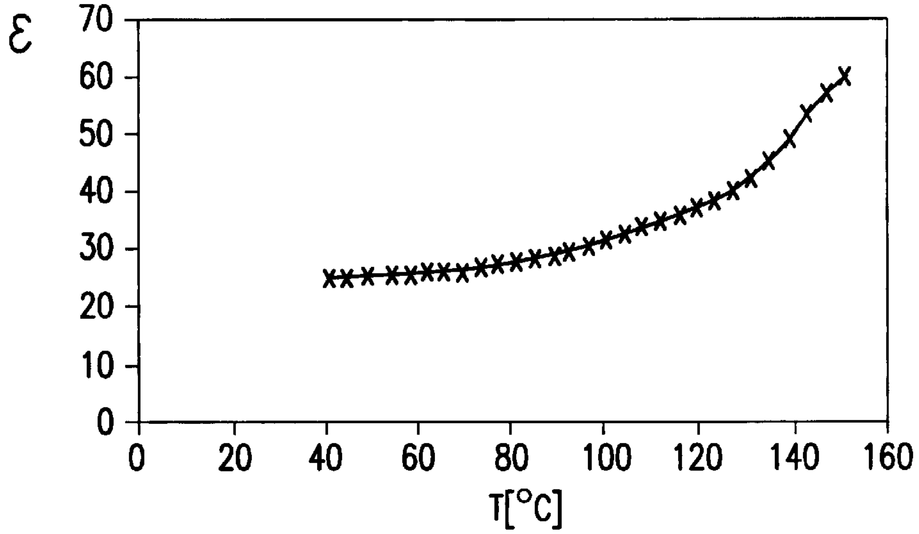
FIG. 7 shows a diagram in which the permittivity of a capacitor is shown as a function of temperature, the capacitor containing a composite material formed in accordance with a further embodiment of the invention as dielectric.

In a further embodiment of the composite material according to the invention, a ferroelectric or antiferroelectric material, for example barium titanate, is provided as filler and a thermoset based on epoxide as polymer matrix. In this composite material, the matrix behaves passively on heating. As is evident from FIG. 7, the permittivity $\epsilon$ of the composite material rises nonlinearly above a temperature of approximately 60° C. This results in a nonlinear capacitance change in a capacitor provided with such a composite material as dielectric. In addition, an additional nonlinear change in the permittivities occurs on applying high voltage.

In another exemplary embodiment, particles of shell-and-core structure are used as fillers. One of these fillers contains cores composed of conducting material such as, in particular, $V_2O_3$, and shells composed of an oxide such as, in particular, $V_2O_2$ or $V_2O_5$. If such fillers are embedded with proportions by volume of typically 20 to 50 percent by volume in a passive matrix, for example a thermoset based on epoxide, such a composite material can advantageously be used as resistor body of a varistor. The current/voltage characteristic curve of a varistor having a resistor body based on an epoxide matrix and a filler containing cores composed of $V_2O_3$ and shells composed of $VO_2$ is shown in FIG. 1 and denoted by the reference symbol II. It can be seen from this characteristic curve that, above a specified limit voltage, the current carried by the varistor increases nonlinearly and consequently limits the applied voltage. Although this limitation is substantially less than in the case of the varistor based on the polymer and ZnO (characteristic curve I) it is, however, completely adequate for many applications, in particular in the low-voltage range. As soon as the varistor has assumed a specified limit power and is heated to a limit temperature which determines a PTC effect, the previously electrically conducting $V_2O_3$ changes its structure and forms a nonconducting phase. This limits the power converted in the varistor nonlinearly. As a result of the second nonlinear change in the characteristic curve, a self-protection against unduly high power consumption is achieved as in the case of the varistor having the characteristic curve I.

The self-protection can be improved if the filler contains cores composed of doped $BaTiO_3$ instead of the cores composed of $V_2O_3$. In this case, the shells are advantageously formed by BaO, BaS, $BaSO_4$, $V_2O_3$, $VO_2$ or $TiO_2$. Since $BaTiO_3$ causes a substantially greater PTC effect than $V_2O_3$ at a specified limit temperature as a consequence of a structural change, such a varistor limits the power to a much greater extent than the varistor described above. This can be inferred from its characteristic curve in FIG. 1, which is denoted by the reference symbol III.

A similar self-protection can be achieved with similar varistor behavior if the cores surrounded by an insulating shell contain semiconducting material such as, for example, Si, SiC, $SnO_2$, $TiO_2$ or ZnO. In the case of such a varistor, as also in the case of the two varistors described above having cores composed of $V_2O_3$ and $BaTiO_3$, the self-protection can be very substantially improved by using a matrix composed of an active polymer, for example a thermoplastic such as polyethylene, as a result of a PTC transition brought about by the polymer matrix analogously to the varistor having the characteristic curve I. This can be inferred from its characteristic curve in FIG. 1 provided with the reference symbol IV.

In another exemplary embodiment, the composite material according to the invention contains particles of core-and-shell structure which are embedded in a polymer matrix and comprise cores composed of material with good electrical conduction, for example composed of a barium/titanium, strontium/titanium or titanium-base alloy, and shells composed of an insulating material having high permittivity such as, for example, undoped barium titanate or strontium titanate. In contrast to a composite material comprising particles composed of solid material and having high permittivity, when an external voltage is applied in the case of this composite material, the electric field is concentrated extremely strongly in the shells. In the event of a temperature change, this results in a particularly severely nonlinear change in the permittivities. Because of a structural change in the shells of the filler, a further nonlinear change in the permittivities of the composite material additionally occurs when a high voltage is applied.

In a further exemplary embodiment, the composite material according to the invention is used as resistor body of a PTC resistor. The composite material contains an active polymer such as, preferably, polyethylene and a filler having core-and-shell structure. Both the cores and the shells are composed of electrically conducting material. The material is selected so that, when acted on by one or more physical quantities, the cores and/or the shells undergo a structural change. The shells are preferably formed from a material with good current conduction, such as $TiB_2$, TiC or a metal. The cores preferably contain $V_2O_3$ or $BaTiO_3$, in each case in doped form. When such a PTC resistor is heated by a current, the contact points of the individual filler particles in the current path are heated initially and, consequently, the filler particles are also heated initially. Above a material-specific transition temperature, the structure of the cores changes and their resistivity increases appreciably in a nonlinear manner because of a PTC effect.

Figure 8:
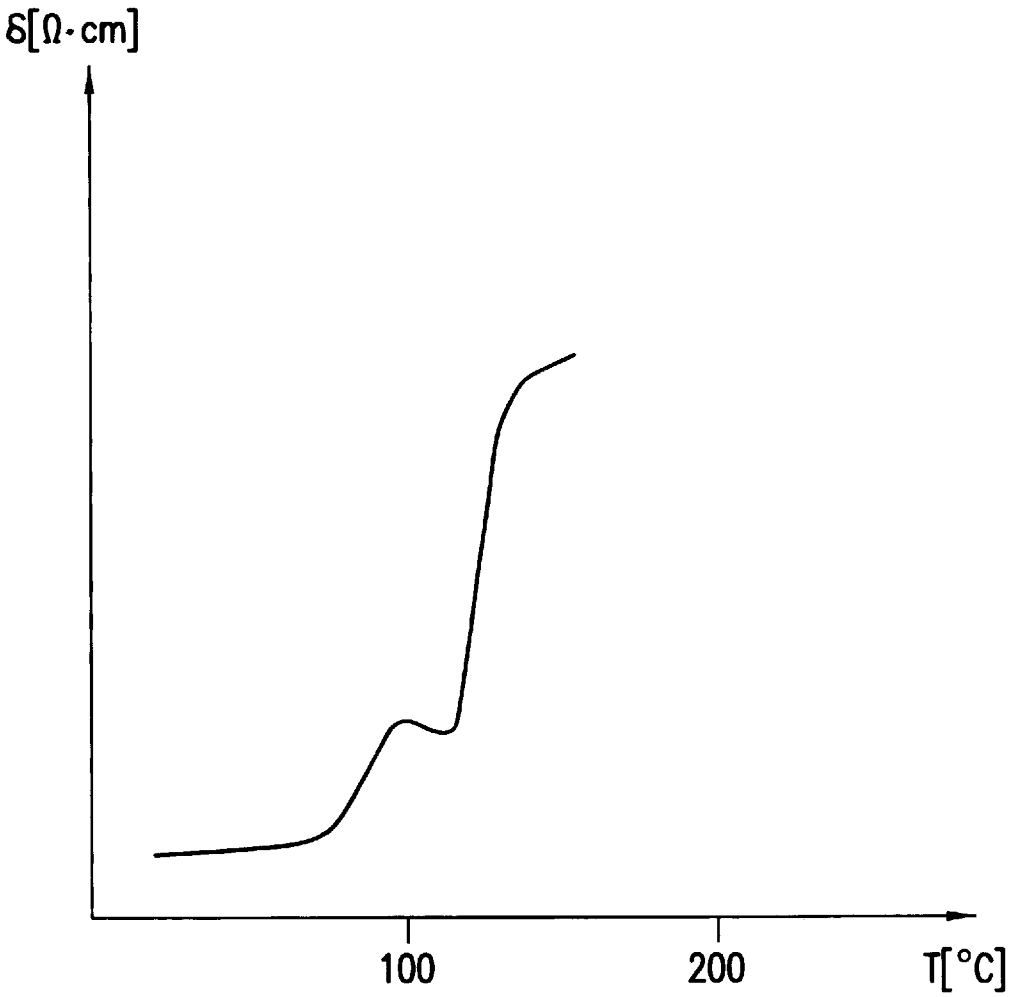
FIG. 8 shows a temperature/resistance characteristic curve of a PTC resistor whose resistor body is composed of a composite material formed in accordance with a further embodiment of the invention.

From FIG. 8 it is evident that said PTC effect increases the resistivity of the PTC element appreciably. The current carried by the resistor is now limited very substantially. This takes place very rapidly because of the rapid heating of the current-carrying particles. The polymer, which heats more slowly, reaches its softening point only after a certain time, expands and interrupts the current paths with a nonlinear increase in the resistivity of the PTC element.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A varistor which limits an applied voltage as a result of a first nonlinear dependence on a current carried by the varistor due to the applied voltage, the varistor consuming power and being based on a composite material comprising a filler and a matrix which embeds the filler, the filler consisting of particles of grained microstructure, and the varistor limiting applied power above a critical current level as a result of a second nonlinear dependence of the current on the applied voltage, wherein the particles of grained microstructure are formed by a process selected from the group consisting of comminuting a sintered ceramic, comminuting a polycrystalline semiconductor, spray drying a suspension and calcining the spray-dried particles, spray drying a solution and calcining the spray-dried particles, spray-drying a suspension and sintering the spray-dried particles, and spray drying a solution and sintering the spray-dried particles.

2. The varistor of claim 1, wherein the particles are composed of a material selected from the group consisting of doped metal oxide, doped metal carbide, $BaTiO_3$, $SrTiO_3$, InSb, GaAs and Si.

3. The varistor of claim 2, wherein the doped metal oxide is selected from the group consisting of SiC, $TiO_2$ and ZnO.

4. A PTC resistor which is based on a composite material comprising a filler and a polymer matrix which embeds the filler, an interaction of the polymer with the filler being effective for limiting an applied current as a result of a first nonlinear dependence of resistivity on a first PTC temperature, the filler comprising an electrically conducting first material whose resistivity depends nonlinearily on the temperature, and wherein the filler is effective in limitation of the applied current as a result of the PTC resistor having a second nonlinear dependence of resistivity on a second PTC temperature which is lower than said first PTC temperature.

5. The PTC resistor of claim 4, wherein the filler consists of particles of core-and-shell structure.

6. The PTC resistor of claim 5, wherein at least one of the cores and the shells are formed from said electrically conducting first material.

7. The PTC resistor of claim 5, wherein the cores are formed from said electrically conducting first material and the shells are formed from a second electrically conducting material.

8. The PTC resistor of claim 7, wherein the first material comprises a material selected from the group consisting of $V_2O_3$ and $BaTiO_3$ and the second material is selected from the group consisting of $TiB_2$, TiC, and a metal.

9. The PTC resistor of claim 5, wherein the shells consist essentially of $TiB_2$, TiC or a metal.

10. The PTC resistor of claim 5, wherein the cores consist essentially of doped $V_2O_3$ or $BaTiO_3$.

11. The PTC resistor of claim 4, wherein the polymer matrix consists essentially of polyethylene.

* * * * *